(12) United States Patent
Adams et al.

(10) Patent No.: US 9,010,085 B2
(45) Date of Patent: *Apr. 21, 2015

(54) TURBINE SECTION OF HIGH BYPASS TURBOFAN

(75) Inventors: Paul R. Adams, Glastonbury, CT (US); Shankar S. Magge, South Windsor, CT (US); Joseph B. Staubach, Colchester, CT (US); Wesley K. Lord, South Glastonbury, CT (US); Frederick M. Schwarz, Glastonbury, CT (US); Gabriel L. Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,175

(22) Filed: Aug. 30, 2012

(65) Prior Publication Data

US 2014/0102076 A1    Apr. 17, 2014

Related U.S. Application Data

(63) Continuation of application No. 13/475,252, filed on May 18, 2012, which is a continuation-in-part of application No. 11/832,107, filed on Aug. 1, 2007, now Pat. No. 8,256,707.

(60) Provisional application No. 61/498,516, filed on Jun. 17, 2011, provisional application No. 61/593,190, filed on Jan. 31, 2012.

(51) Int. Cl.
*F02K 3/02* (2006.01)
*F02C 7/36* (2006.01)
*F02K 3/06* (2006.01)

(Continued)

(52) U.S. Cl.
CPC . *F02C 3/113* (2013.01); *F02C 7/36* (2013.01); *F02K 3/06* (2013.01); *F02K 3/075* (2013.01); *F02K 3/025* (2013.01)

(58) Field of Classification Search
USPC ............. 60/39.15–39.163, 226.1, 226.3, 262, 60/268; 415/66, 68, 69, 199.4, 199.5, 220; 416/198 A, 201 R
See application file for complete search history.

(56) References Cited

U.S. PATENT DOCUMENTS 3,327,971 A    6/1967    Stewart et al.
3,754,484 A    8/1973    Roberts
4,037,809 A    7/1977    Legrand (Continued)

FOREIGN PATENT DOCUMENTS

GB    2010969 A    7/1979

OTHER PUBLICATIONS

Kandebo, Stanley, Geared-Turbofan Engine Design Targets Cost, Coplexity, Aviation Week & Space Technology, Feb. 23, 1998.*
Stanley W. Kandebo, "Geared-Turbofan Engine Design Targets Cost, Complexity", Aviation Week & Space Technology, Feb. 23, 1998, vol. 148, p. 32, The McGraw-Hill Companies, Inc., New York, NY.
Michael Cusick, "Avco Lycoming's ALF 502 High Bypass Fan Engine," SAE Technical Paper 810618, 1981, doi:10.4271/810618, Society of Automotive Engineers, Inc., Warrendale, PA.

(Continued)

*Primary Examiner* — Craig Kim
(74) *Attorney, Agent, or Firm* — Bachman & LaPointe, P.C.

(57) ABSTRACT

A turbofan engine has an engine case and a gaspath through the engine case. A fan has a circumferential array of fan blades. The engine further has a compressor, a combustor, a gas generating turbine, and a low pressure turbine section. A speed reduction mechanism couples the low pressure turbine section to the fan. A bypass area ratio is greater than about 6.0. The low pressure turbine section airfoil count to bypass area ratio ratio is below about 170.

23 Claims, 3 Drawing Sheets

(51) Int. Cl.
F02C 3/113 (2006.01)
F02K 3/075 (2006.01)

(56) References Cited

U.S. PATENT DOCUMENTS

| | | | |
|---|---|---|---|
| 4,044,973 A | | 8/1977 | Moorehead |
| 4,266,741 A | | 5/1981 | Murphy |
| 4,313,711 A | * | 2/1982 | Lee .................................. 415/7 |
| 4,966,338 A | | 10/1990 | Gordon |
| 4,969,325 A | * | 11/1990 | Adamson et al. ............ 60/226.1 |
| 5,136,839 A | | 8/1992 | Armstrong |
| 5,174,525 A | | 12/1992 | Schilling |
| 5,273,393 A | | 12/1993 | Jones et al. |
| 5,275,357 A | | 1/1994 | Seelen et al. |
| 5,277,382 A | | 1/1994 | Seelen et al. |
| 5,320,307 A | | 6/1994 | Spofford et al. |
| 5,372,338 A | | 12/1994 | Carlin et al. |
| 5,409,184 A | | 4/1995 | Udall et al. |
| 5,433,674 A | | 7/1995 | Sheridan et al. |
| 5,443,229 A | | 8/1995 | O'Brien et al. |
| 5,452,575 A | | 9/1995 | Freid |
| 5,474,258 A | | 12/1995 | Taylor et al. |
| 5,497,961 A | | 3/1996 | Newton |
| 5,746,391 A | | 5/1998 | Rodgers et al. |
| 5,810,287 A | | 9/1998 | O'Boyle et al. |
| 5,860,276 A | | 1/1999 | Newton |
| 5,871,175 A | | 2/1999 | Demouzon et al. |
| 5,871,176 A | | 2/1999 | Demouzon et al. |
| 5,871,177 A | | 2/1999 | Demouzon et al. |
| 5,921,500 A | | 7/1999 | Ellis et al. |
| 5,927,644 A | | 7/1999 | Ellis et al. |
| 6,126,110 A | | 10/2000 | Seaquist et al. |
| 6,138,949 A | | 10/2000 | Manende et al. |
| 6,189,830 B1 | | 2/2001 | Schnelz et al. |
| 6,223,616 B1 | | 5/2001 | Sheridan |
| 6,474,597 B1 | | 11/2002 | Cazenave |
| 6,517,027 B1 | | 2/2003 | Abruzzese |
| 6,619,030 B1 | * | 9/2003 | Seda et al. .................... 60/226.1 |
| 6,652,222 B1 | | 11/2003 | Wojtyczka et al. |
| 6,708,925 B2 | | 3/2004 | Udall |
| 6,899,518 B2 | | 5/2005 | Lucas et al. |
| 6,935,591 B2 | | 8/2005 | Udall |
| 7,021,585 B2 | | 4/2006 | Loewenstein et al. |
| 7,055,330 B2 | | 6/2006 | Miller |
| 7,134,286 B2 | | 11/2006 | Markarian et al. |
| 7,591,754 B2 | | 9/2009 | Duong et al. |
| 7,654,075 B2 | | 2/2010 | Udall |
| 7,677,493 B2 | | 3/2010 | Diochon et al. |
| 7,694,505 B2 | | 4/2010 | Schilling |
| 7,824,305 B2 | | 11/2010 | Duong et al. |
| 7,841,165 B2 | * | 11/2010 | Orlando et al. ................. 60/204 |
| 7,926,260 B2 | | 4/2011 | Sheridan et al. |
| 8,205,432 B2 | | 6/2012 | Sheridan |
| 2001/0010798 A1 | * | 8/2001 | Dailey et al. .................. 415/159 |
| 2006/0090448 A1 | | 5/2006 | Henry et al. |
| 2006/0248900 A1 | | 11/2006 | Suciu et al. |
| 2009/0056343 A1 | | 3/2009 | Suciu et al. |
| 2009/0092487 A1 | | 4/2009 | McCune et al. |
| 2011/0056183 A1 | * | 3/2011 | Sankrithi et al. ................ 60/204 |
| 2011/0123326 A1 | | 5/2011 | DiBenedetto et al. |
| 2012/0291449 A1 | | 11/2012 | Adams et al. |

OTHER PUBLICATIONS

Karl R. Fledderjohn, "The TFE731-5: Evolution of a Decade of Business Jet Service," SAE Technical Paper 830756, 1983, doi:10.4271/830756, Society of Automotive Engineers, Inc., Warrendale, PA.
T. A. Dickey. and E.R. Dobak, "The Evolution and Development Status of the ALF 502 Turbofan Engine," SAE Technical Paper 720840, 1972, doi:10.4271/720840, Society of Automotive Engineers, Inc., Warrendale, PA.
Jane's Aero-Engines, Ivchenko-Progress AI-727M, 2011, IHS Global Limited, Coulsdon, United Kingdom.
Jane's Aero-Engines, Rolls-Royce M45H, IHS Global Limited, Coulsdon, United Kingdom.
Jane's Aero-Engines, Turbomeca Aubisque, IHS Global Limited, Coulsdon, United Kingdom.
Jane's Aero-Engines, Aviadvigatel D-110, IHS Global Limited, Coulsdon, United Kingdom.
Jane's Aero-Engines, Honeywell LF502, IHS Global Limited, Coulsdon, United Kingdom.
Jane's Aero-Engines, Honeywell LF507, IHS Global Limited, Coulsdon, United Kingdom.
Jane's Aero-Engines, Honeywell TFE731, IHS Global Limited, Coulsdon, United Kingdom.
Jane's Aero-Engines, Ivchenko-Progress D-727, IHS Global Limited, Coulsdon, United Kingdom.
Jane's Aero-Engines, Ivchenko-Progress D-436, IHS Global Limited, Coulsdon, United Kingdom.
Applicant-Admitted Prior Art: Flight International, Avco Lycoming ALF502F-2 Cutaway, 2007, http://www.flightglobal.com/airspace/media/aeroenginesjetcutaways/avco-lycoming-alf502r-2-cutaway-5582.aspx.
Applicant-Admitted Prior Art: Flight International, Lycoming LF507F Cutaway, 2007, http://www.flightglobal.com/airspace/media/aeroenginesjetcutaways/avco-lycoming-alf502r-2-cutaway-5582.aspx.
Applicant-Admitted Prior Art: Flight International, Garrett TFE531 Cutaway, 2007,http://www.flightglobal.com/airspace/ media/aeroenginesjetcutaways/avco-lycoming-alf502r-2-cutaway-5582.aspx.
NASA Conference Publication 2077, "Quiet, Powered-Lift Propulsion", Conference held at Lewis Research Center, Cleveland, Ohio, Nov. 14-15, 1978, pp. 79-81.
Jane's Aero-Engines, Edited by Bill Gunston, Issue Seven, Mar. 2000, pp. 510-512, United Kingdom.
Applicant-Admitted Prior Art: V2500 Fact Sheet, International Aero Engines, http://i-a-e.com/wp-content/uploads/2012/03/facts.pdf Jun. 15, 2012.
Applicant-Admitted Prior Art: Diagram "GE 90 Engine Airflow" http://ctr-sgi1.stanford.edu/CITS/ge90.html downloaded Jun. 15, 2012.
Applicant-Admitted Prior Art: TFE 731-20 PR Sheet, http://design.ae.utexas.edu/subjet/worldTFE731_4.jpg downloaded Jun. 15, 2012.
Applicant-Admitted Prior Art: Rolls Royce Trent 800, cutaway view, http://www.epower-propulsion.com/epower/gallery/ABP-RR%20Trent%20800%20cutaway.htm downloaded Jun. 15, 2012.
Applicant-admitted prior art: Rolls-Royce Trent cutaway view from http://web.mit.edu/aeroastro/labs/gtl/early_GT_history.html downloaded Jun. 15, 2012.
Applicant-admitted prior art: Garrett TFE 731-3 sectional view from http://perso.ovh.net/~caeaxtke/fr/coll/falcon50_5.html downloaded Jun. 15, 2012.
Applicant-admitted prior art: Rolls-Royce Trent 1000 cutaway view from http://hackedgadgets.com/2011/08/02/how-to-build-a-rolls-royce-trent-1000-jet-engine-used-in-the-boeing-787/ downloaded Jun. 15, 2012.
Applicant-admitted prior art: Rolls-Royce Trent cutaway view from http://www.warandtactics.com/smf/planet-earth-the-serious-stuff-non-mil-news/a-380-emergency-landing!/downloaded Jun. 15, 2012.
Eric S. Hendricks and Michael T. Tong, "Performance and Weight Estimates for an Advanced Open Rotor Engine", 48th Joint Propulsion Conference and Exhibit, Jul. 30, 2012, NASA/TM-2012-217710, AIAA-2012-3911, NASA Glenn Research Center, Cleveland, Ohio.
General Electric F101, Jane's Aero-Engines, dated Oct. 11, 2012, IHS Global Limited, Coulsdon, United Kingdom.
General Electric F101, Scramble—The Aviation Magazine, Oct. 24, 2011, downloaded May 17, 2013 from http://wiki.scramble.nl/index.php?title=General_Electric_F101#F101-GE-100.
Office Action dated Feb. 21, 2014 in U.S. Appl. No. 14/102,764.
Notice of Allowance for U.S. Appl. No. 13/475,252, dated May 27, 2014 and allowed claims.
Notice of Allowance for U.S. Appl. No. 14/102,764, dated May 30, 2014 and allowed claims.

* cited by examiner

TURBINE SECTION OF HIGH BYPASS TURBOFAN

CROSS-REFERENCE TO RELATED APPLICATION

This is a continuation of U.S. patent application Ser. No. 13/475,252, filed May 18, 2012, and entitled "Turbine Section of High Bypass Turbofan", which is a Continuation-in-Part application of Ser. No. 11/832,107, filed Aug. 1, 2007, and entitled "Engine Mounting Configuration for a Turbofan Gas Turbine Engine" and benefit is claimed of U.S. Patent Application Ser. No. 61/593,190, filed Jan. 31, 2012, and entitled "Turbine Section of High Bypass Turbofan" and U.S. Patent Application Ser. No. 61/498,516, filed Jun. 17, 2011, and entitled "Turbine Section of High Bypass Turbofan", the disclosures of which are incorporated by reference herein in their entireties as if set forth at length.

BACKGROUND

The disclosure relates to turbofan engines. More particularly, the disclosure relates to low pressure turbine sections of turbofan engines which power the fans via a speed reduction mechanism.

There has been a trend toward increasing bypass ratio in gas turbine engines. This is discussed further below. There has generally been a correlation between certain characteristics of bypass and the diameter of the low pressure turbine section sections of turbofan engines.

SUMMARY

One aspect of the disclosure involves a turbofan engine having an engine case and a gaspath through the engine case. A fan has a circumferential array of fan blades. The engine further has a compressor in fluid communication with the fan, a combustor in fluid communication with the compressor, a turbine in fluid communication with the combustor, wherein the turbine includes a low pressure turbine section having 3 to 6 blade stages. A speed reduction mechanism couples the low pressure turbine section to the fan. A bypass area ratio is greater than about 6.0. A ratio of the total number of airfoils in the low pressure turbine section divided by the bypass area ratio is less than about 170.

In additional or alternative embodiments of any of the foregoing embodiments, the bypass area ratio may be greater than about 8.0 or may be between about 8.0 and about 20.0.

In additional or alternative embodiments of any of the foregoing embodiments, a fan case may encircle the fan blades radially outboard of the engine case.

In additional or alternative embodiments of any of the foregoing embodiments, the compressor may comprise a low pressure compressor section and a high pressure compressor section.

In additional or alternative embodiments of any of the foregoing embodiments, the blades of the low pressure compressor section and low pressure turbine section may share low shaft.

In additional or alternative embodiments of any of the foregoing embodiments, the high pressure compressor section and a high pressure turbine section of the turbine may share a high shaft.

In additional or alternative embodiments of any of the foregoing embodiments, there are no additional compressor or turbine sections.

In additional or alternative embodiments of any of the foregoing embodiments, the speed reduction mechanism may comprise an epicyclic transmission coupling the low speed shaft to a fan shaft to drive the fan with a speed reduction.

In additional or alternative embodiments of any of the foregoing embodiments, the low pressure turbine section may have an exemplary 3 to 5 blade stages or 3 to 4 blade stages.

In additional or alternative embodiments of any of the foregoing embodiments, a hub-to-tip ratio ($R_I:R_O$) of the low pressure turbine section may be between about 0.4 and about 0.5 measured at the maximum $R_O$ axial location in the low pressure turbine section.

In additional or alternative embodiments of any of the foregoing embodiments, a ratio of maximum gaspath radius along the low pressure turbine section to maximum radius of the fan may be less than about 0.55, or less than about 0.50, or between about 0.35 and about 0.50.

In additional or alternative embodiments of any of the foregoing embodiments, said ratio of low pressure turbine section airfoil count to bypass area ratio may be between is about 10 and about 150.

In additional or alternative embodiments of any of the foregoing embodiments, an airfoil count of the low pressure turbine section may be below about 1600.

In additional or alternative embodiments of any of the foregoing embodiments, the engine may be in combination with a mounting arrangement (e.g., of an engine pylon) wherein an aft mount reacts at least a thrust load.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
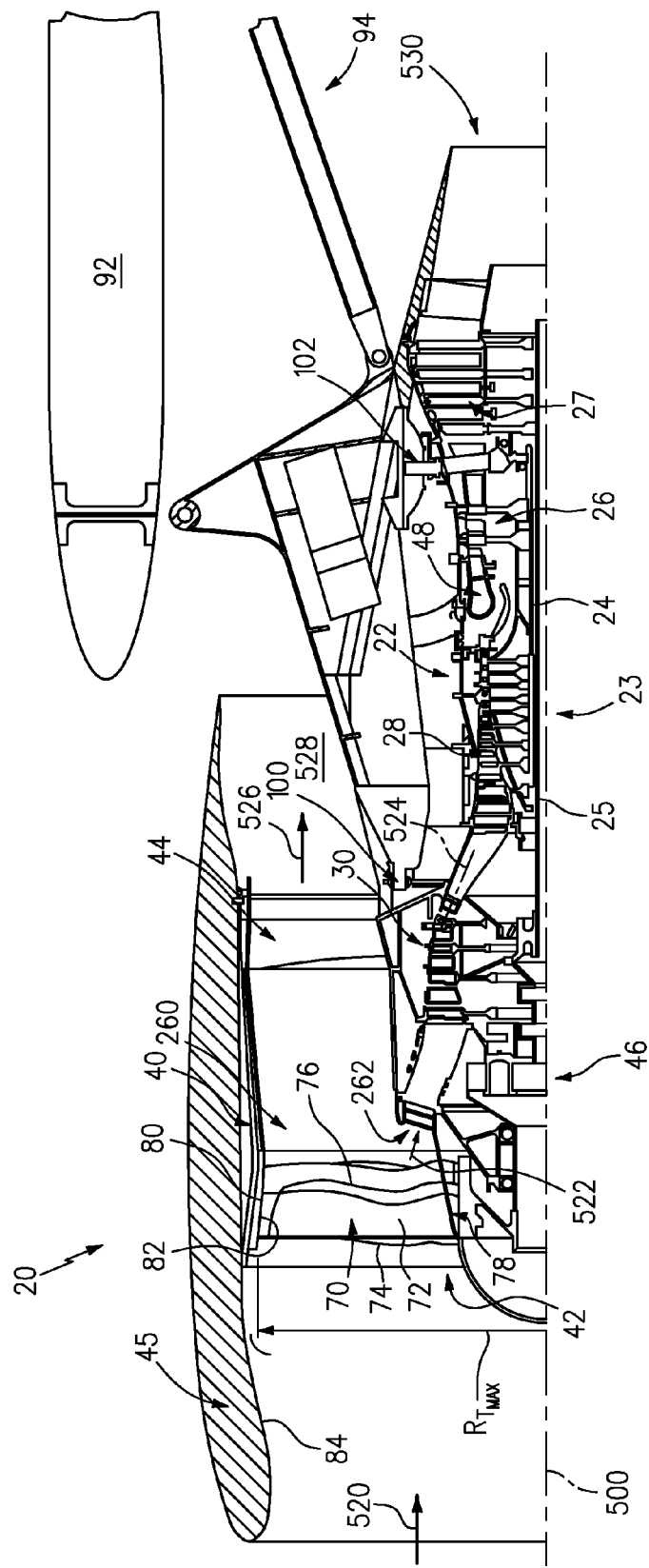
FIG. 1 is an axial sectional view of a turbofan engine.

FIG. 1 shows a turbofan engine 20 having a main housing (engine case) 22 containing a rotor shaft assembly 23. An exemplary engine is a high-bypass turbofan. In such an engine, the normal cruise condition bypass area ratio of air mass flowing outside the case 22 (e.g., the compressor sections and combustor) to air mass passing through the case 22 is typically in excess of about 4.0 and, more narrowly, typically between about 4.0 and about 12.0. Via high 24 and low 25 shaft portions of the shaft assembly 23, a high pressure turbine section (gas generating turbine) 26 and a low pressure turbine section 27 respectively drive a high pressure compressor section 28 and a low pressure compressor section 30. As used herein, the high pressure turbine section experiences higher pressures that the low pressure turbine section. A low pressure turbine section is a section that powers a fan 42. Although a two-spool (plus fan) engine is shown, one of many alternative variations involves a three-spool (plus fan) engine wherein an intermediate spool comprises an intermediate pressure compressor between the low fan and high pressure compressor section and an intermediate pressure turbine between the high pressure turbine section and low pressure turbine section.

The engine extends along a longitudinal axis 500 from a fore end to an aft end. Adjacent the fore end, a shroud (fan case) 40 encircles the fan 42 and is supported by vanes 44. An aerodynamic nacelle around the fan case is shown and an aerodynamic nacelle 45 around the engine case is shown.

The low shaft portion 25 of the rotor shaft assembly 23 drives the fan 42 through a speed reduction mechanism 46. An exemplary speed reduction mechanism is an epicyclic transmission, namely a star or planetary gear system. As is discussed further below, an inlet airflow 520 entering the nacelle is divided into a portion 522 passing along a core flowpath 524 and a bypass portion 526 passing along a bypass flowpath 528. With the exception of diversions such as cooling air, etc., flow along the core flowpath sequentially passes through the low pressure compressor section, high pressure compressor section, a combustor 48, the high pressure turbine section, and the low pressure turbine section before exiting from an outlet 530.

Figure 3:
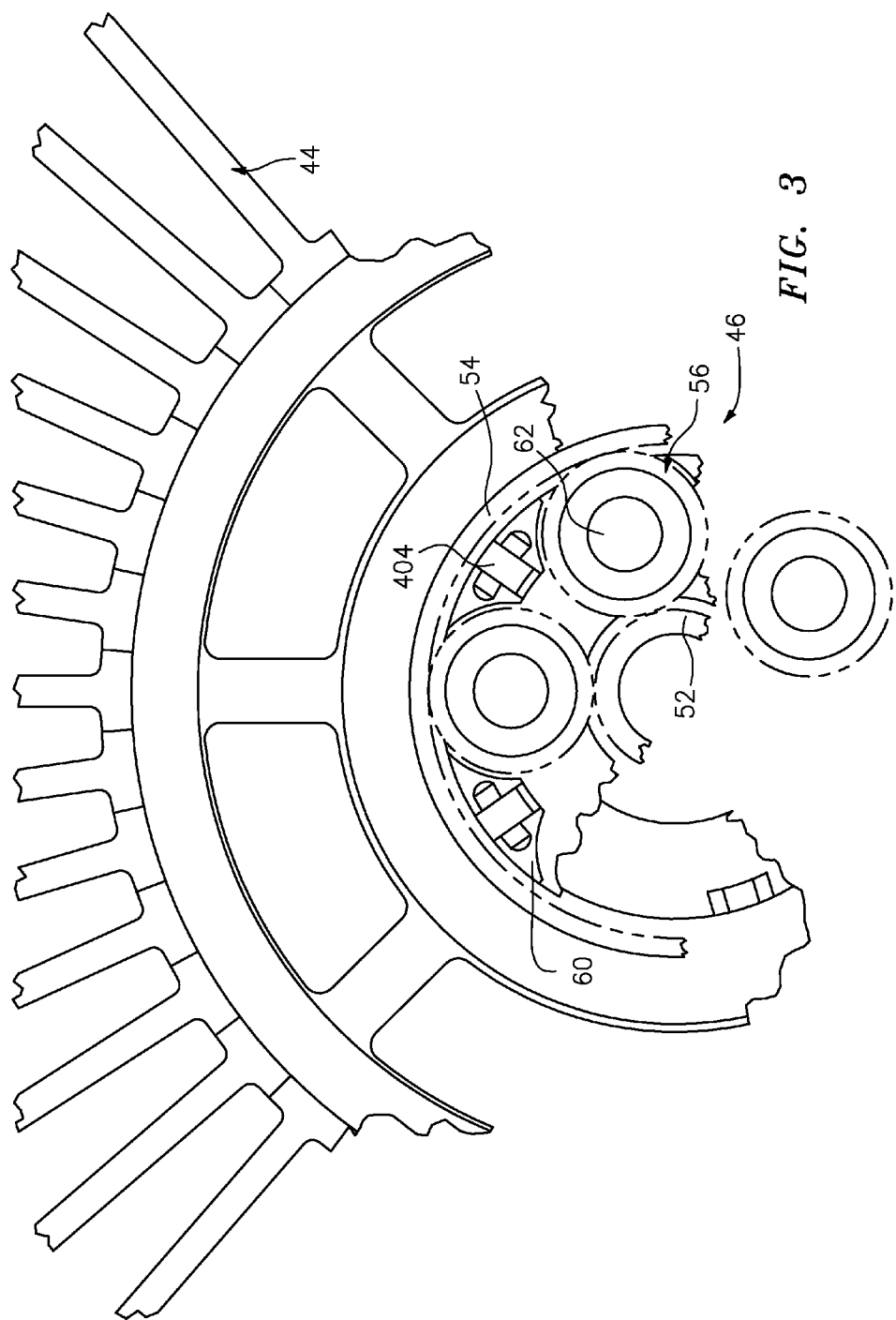
FIG. 3 is transverse sectional view of transmission of the engine of FIG. 1.

FIG. 3 schematically shows details of the transmission 46. A forward end of the low shaft 25 is coupled to a sun gear (or other high speed input to the speed reduction mechanism). The externally-toothed sun gear 52 is encircled by a number of externally-toothed star gears 56 and an internally-toothed ring gear 54. The exemplary ring gear is coupled to the fan to rotate with the fan as a unit.

The star gears 56 are positioned between and enmeshed with the sun gear and ring gear. A cage or star carrier assembly 60 carries the star gears via associated journals 62. The exemplary star carrier is substantially irrotatably mounted relative via fingers 404 to the case 22.

Another transmission/gearbox combination has the star carrier connected to the fan and the ring is fixed to the fixed structure (case) is possible and such is commonly referred to as a planetary gearbox.

The speed reduction ratio is determined by the ratio of diameters within the gearbox. An exemplary reduction is between about 2:1 and about 13:1.

The exemplary fan (FIG. 1) comprises a circumferential array of blades 70. Each blade comprises an airfoil 72 having a leading edge 74 and a trailing edge 76 and extending from an inboard end 78 at a platform to an outboard end 80 (i.e., a free tip). The outboard end 80 is in close facing proximity to a rub strip 82 along an interior surface 84 of the nacelle and fan case.

To mount the engine to the aircraft wing 92, a pylon 94 is mounted to the fan case and/or to the other engine cases. The exemplary pylon 94 may be as disclosed in U.S. patent application Ser. No. 11/832,107 (US2009/0056343A1). The pylon comprises a forward mount 100 and an aft/rear mount 102. The forward mount may engage the engine intermediate case (IMC) and the aft mount may engage the engine thrust case. The aft mount reacts at least a thrust load of the engine.

To reduce aircraft fuel burn with turbofans, it is desirable to produce a low pressure turbine with the highest efficiency and lowest weight possible. Further, there are considerations of small size (especially radial size) that benefit the aerodynamic shape of the engine cowling and allow room for packaging engine subsystems.

Figure 2:
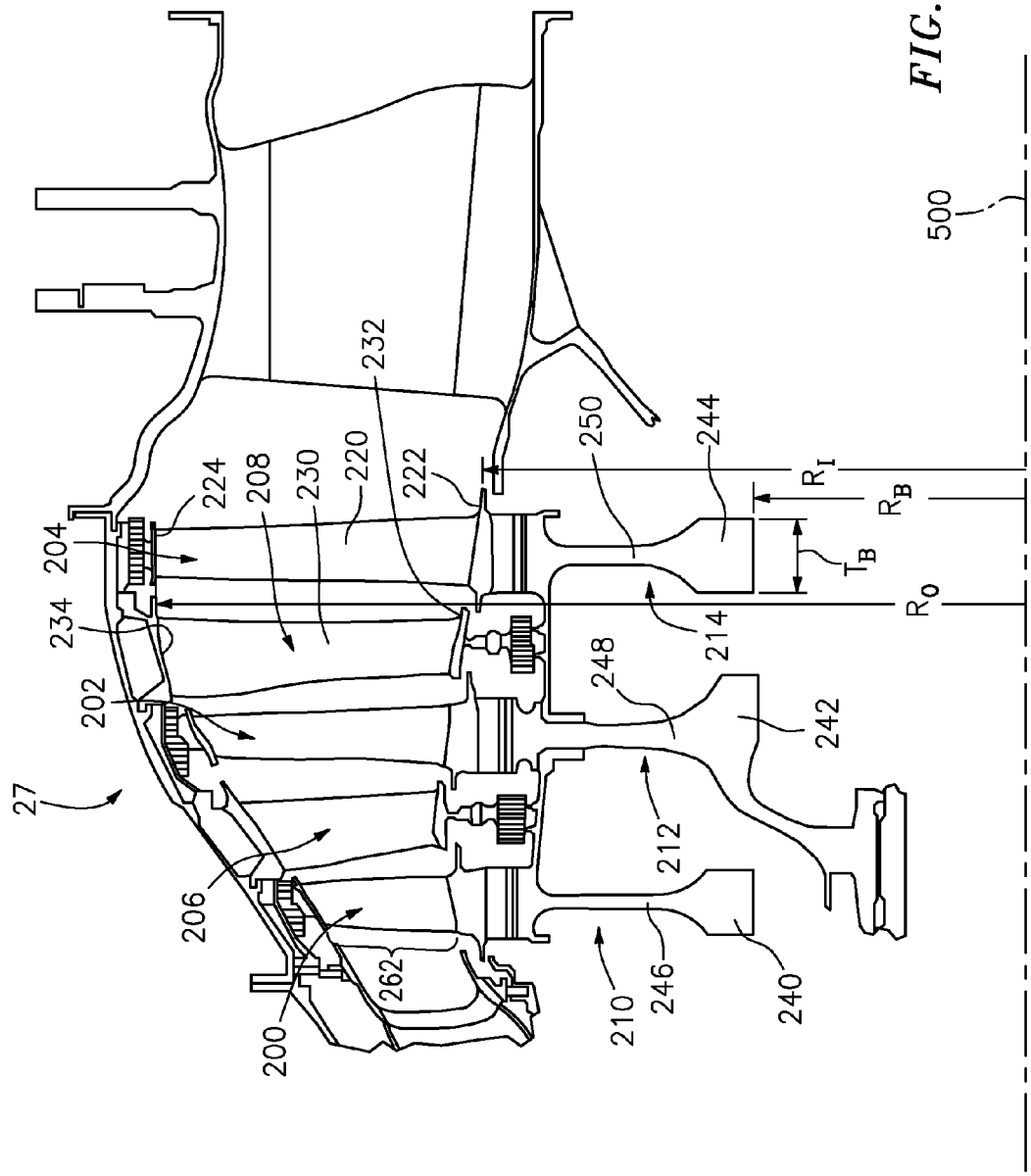
FIG. 2 is an axial sectional view of a low pressure turbine section of the engine of FIG. 1.

FIG. 2 shows the low pressure turbine section 27 as comprising an exemplary three blade stages 200, 202, 204. An exemplary blade stage count is 2-6, more narrowly, 2-4, or 2-3, 3-5, or 3-4. Interspersed between the blade stages are vane stages 206 and 208. Each exemplary blade stage comprises a disk 210, 212, and 214, respectively. A circumferential array of blades extends from peripheries of each of the disks. Each exemplary blade comprises an airfoil 220 extending from an inner diameter (ID) platform 222 to an outer diameter (OD) shroud 224 (shown integral with the airfoil An alternative may be an unshrouded blade with a rotational gap between the tip of the blade and a stationary blade outer air seal (BOAS)). Each exemplary shroud 224 has outboard sealing ridges which seal with abradable seals (e.g., honeycomb) fixed to the case. The exemplary vanes in stages 206 and 208 include airfoils 230 extending from ID platforms 232 to OD shrouds 234. The exemplary OD shrouds 234 are directly mounted to the case. The exemplary platforms 232 carry seals for sealing with inter-disk knife edges protruding outwardly from inter-disk spacers which may be separate from the adjacent disks or unitarily formed with one of the adjacent disks.

Each exemplary disk 210, 212, 214 comprises an enlarged central annular protuberance or "bore" 240, 242, 244 and a thinner radial web 246, 248, 250 extending radially outboard from the bore. The bore imparts structural strength allowing the disk to withstand centrifugal loading which the disk would otherwise be unable to withstand.

A turbofan engine is characterized by its bypass ratio (mass flow ratio of air bypassing the core to air passing through the core) and the geometric bypass area ratio (ratio of fan duct annulus area outside/outboard of the low pressure compressor section inlet (i.e., at location 260 in FIG. 1) to low pressure compressor section inlet annulus area (i.e., at location 262 in FIG. 2). High bypass engines typically have bypass area ratio of at least four. There has been a correlation between increased bypass area ratio and increased low pressure turbine section radius and low pressure turbine section airfoil count. As is discussed below, this correlation may be broken by having an engine with relatively high bypass area ratio and relatively low turbine size.

By employing a speed reduction mechanism (e.g., a transmission) to allow the low pressure turbine section to turn very fast relative to the fan and by employing low pressure turbine section design features for high speed, it is possible to create a compact turbine module (e.g., while producing the same amount of thrust and increasing bypass area ratio). The exemplary transmission is a epicyclic transmission. Alternative transmissions include composite belt transmissions, metal chain belt transmissions, fluidic transmissions, and electric means (e.g., a motor/generator set where the turbine turns a generator providing electricity to an electric motor which drives the fan).

Compactness of the turbine is characterized in several ways. Along the compressor and turbine sections, the core gaspath extends from an inboard boundary (e.g., at blade hubs or outboard surfaces of platforms of associated blades and vanes) to an outboard boundary (e.g., at blade tips and inboard surfaces of blade outer air seals for unshrouded blade tips and at inboard surfaces of OD shrouds of shrouded blade tips and at inboard surfaces of OD shrouds of the vanes). These boundaries may be characterized by radii $R_I$ and $R_O$, respectively, which vary along the length of the engine.

For low pressure turbine radial compactness, there may be a relatively high ratio of radial span ($R_O$-$R_I$) to radius ($R_O$ or $R_I$). Radial compactness may also be expressed in the hub-to-tip ratio ($R_I$:$R_O$). These may be measured at the maximum $R_O$ location in the low pressure turbine section. The exemplary compact low pressure turbine section has a hub-to-tip ratio close to about 0.5 (e.g., about 0.4-0.5 or about 0.42-0.48, with an exemplary about 0.46).

Another characteristic of low pressure turbine radial compactness is relative to the fan size. An exemplary fan size measurement is the maximum tip radius $R_{Tmax}$ of the fan blades. An exemplary ratio is the maximum $R_O$ along the low pressure turbine section to $R_{Tmax}$ of the fan blades. Exemplary values for this ratio are less than about 0.55 (e.g., about 0.35-55), more narrowly, less than about 0.50, or about 0.35-0.50.

To achieve compactness the designer may balance multiple physical phenomena to arrive at a system solution as defined by the low pressure turbine hub-to-tip ratio, the fan maximum tip radius to low pressure turbine maximum $R_O$ ratio, the bypass area ratio, and the bypass area ratio to low pressure turbine airfoil count ratio. These concerns include, but are not limited to: a) aerodynamics within the low pressure turbine, b) low pressure turbine blade structural design, c) low pressure turbine disk structural design, and d) the shaft connecting the low pressure turbine to the low pressure compressor and speed reduction device between the low pressure compressor and fan. These physical phenomena may be balanced in order to achieve desirable performance, weight, and cost characteristics.

The addition of a speed reduction device between the fan and the low pressure compressor creates a larger design space because the speed of the low pressure turbine is decoupled from the fan. This design space provides great design variables and new constraints that limit feasibility of a design with respect to physical phenomena. For example the designer can independently change the speed and flow area of the low pressure turbine to achieve optimal aerodynamic parameters defined by flow coefficient (axial flow velocity/wheel speed) and work coefficient (wheel speed/square root of work). However, this introduces structural constraints with respect blade stresses, disk size, material selection, etc.

In some examples, the designer can choose to make low pressure turbine section disk bores much thicker relative to prior art turbine bores and the bores may be at a much smaller radius $R_B$. This increases the amount of mass at less than a "self sustaining radius". Another means is to choose disk materials of greater strength than prior art such as the use of wrought powdered metal disks to allow for extremely high centrifugal blade pulls associated with the compactness.

Another variable in achieving compactness is to increase the structural parameter $AN^2$ which is the annulus area of the exit of the low pressure turbine divided by the low pressure turbine rpm squared at its redline or maximum speed. Relative to prior art turbines, which are greatly constrained by fan blade tip mach number, a very wide range of $AN^2$ values can be selected and optimized while accommodating such constraints as cost or a countering, unfavorable trend in low pressure turbine section shaft dynamics. In selecting the turbine speed (and thereby selecting the transmission speed ratio, one has to be mindful that at too high a gear ratio the low pressure turbine section shaft (low shaft) will become dynamically unstable.

The higher the design speed, the higher the gear ratio will be and the more massive the disks will become and the stronger the low pressure turbine section disk and blade material will have to be. All of these parameters can be varied simultaneously to change the weight of the turbine, its efficiency, its manufacturing cost, the degree of difficulty in packaging the low pressure turbine section in the core cowling and its durability. This is distinguished from a prior art direct drive configuration, where the high bypass area ratio can only be achieved by a large low pressure turbine section radius. Because that radius is so very large and, although the same variables (airfoil turning, disk size, blade materials, disk shape and materials, etc.) are theoretically available, as a practical matter economics and engine fuel burn considerations severely limit the designer's choice in these parameters.

Another characteristic of low pressure turbine section size is airfoil count (numerical count of all of the blades and vanes in the low pressure turbine). Airfoil metal angles can be selected such that airfoil count is low or extremely low relative to a direct drive turbine. In known prior art engines having bypass area ratio above 6.0 (e.g. 8.0-20), low pressure turbine sections involve ratios of airfoil count to bypass area ratio above 190.

With the full range of selection of parameters discussed above including, disk bore thickness, disk material, hub to tip ratio, and $R_O/R_{Tmax}$, the ratio of airfoil count to bypass area ratio may be below about 170 to as low as 10. (e.g., below about 150 or an exemplary about 10-170, more narrowly about 10-150). Further, in such embodiments the airfoil count may be below about 1700, or below about 1600.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

What is claimed is:

1. A turbofan engine comprising:
an engine case;
a gaspath through the engine case;
a fan having a circumferential array of fan blades;
a compressor in fluid communication with the fan;
a combustor in fluid communication with the compressor;
a turbine in fluid communication with the combustor, the turbine having a low pressure turbine section having 3 to 6 blade stages; and
a speed reduction mechanism coupling the low pressure turbine section to the fan, wherein:
a ratio of maximum gaspath radius along the low pressure turbine section to maximum radius of the fan is less than about 0.55;
a bypass area ratio is greater than about 6.0; and
a ratio of a low pressure turbine section airfoil count to the bypass area ratio is less than about 170.

2. The engine of claim 1 wherein:
the bypass area ratio is greater than about 8.0.

3. The engine of claim 1 wherein:
the bypass area ratio is between about 8.0 and about 20.0.

4. The engine of claim 1 further comprising:
a fan case encircling the fan blades radially outboard of the engine case.

5. The engine of claim 1 wherein:
a hub-to-tip ratio ($R_I:R_O$) of the low pressure turbine section is between about 0.4 and about 0.5 measured at the maximum $R_O$ axial location in the low pressure turbine section.

6. The engine of claim 5 wherein:
the low pressure turbine section has 3 to 5 blade stages.

7. The engine of claim 5 wherein:
a ratio of maximum gaspath radius along the low pressure turbine section to maximum radius of the fan is less than about 0.50.

8. The engine of claim 5 wherein:
an airfoil count of the low pressure turbine section is below about 1600.

9. The engine of claim 1 wherein:
the low pressure turbine section has blade stages interspersed with vane stages.

10. The engine of claim 1 wherein:
said ratio of maximum gaspath radius along the low pressure turbine section to maximum radius of the fan is less than about 0.50.

11. The engine of claim 10 wherein:
said ratio of maximum gaspath radius along the low pressure turbine section to maximum radius of the fan is between about 0.35 and about 0.50.

12. The engine of claim 1 wherein:
said ratio of low pressure turbine section airfoil count to bypass area ratio is between about 10 and about 150.

13. The engine of claim 1 wherein:
the compressor comprises:
 a low pressure compressor section; and
 a high pressure compressor section.

14. The engine of claim 13 wherein:
the turbine has a high pressure turbine section coupled to drive the high pressure compressor section.

15. The engine of claim 14 wherein:
there are no additional compressor or turbine sections.

16. The engine of claim 13 wherein:
blades of the low pressure compressor section and low pressure turbine section share a shaft; and
the speed reduction mechanism comprises an epicyclic transmission that couples the shaft to a fan shaft to drive the fan with a speed reduction.

17. The engine of claim 1 wherein:
the speed reduction mechanism comprises an epicyclic transmission.

18. The engine of claim 1 wherein:
the low pressure turbine section has 3 to 4 blade stages.

19. The engine of claim 1 wherein:
the low pressure turbine section has 3 blade stages.

20. The engine of claim 1 wherein:
an airfoil count of the low pressure turbine section is below about 1600.

21. The engine of claim 1 in combination with a mounting arrangement wherein an aft mount reacts at least a thrust load.

22. A turbofan engine comprising:
a fan case, and a gas generator including a core cowl, wherein the fan case and core cowl are configured so that a flow-path bypass ratio therebetween is greater than about 6.0; and
wherein:
 a ratio of maximum gaspath radius along a low pressure turbine section to maximum radius of the fan is less than about 0.55; and
 the gas generator includes a fan drive turbine configured so that a ratio of a turbine airfoil count to the bypass ratio is less than about 170.

23. The engine of claim 22 wherein:
the engine has only a single fan stage; and
the low pressure turbine section has blade stages interspersed with vane stages.

\* \* \* \* \*